UNITED STATES PATENT OFFICE.

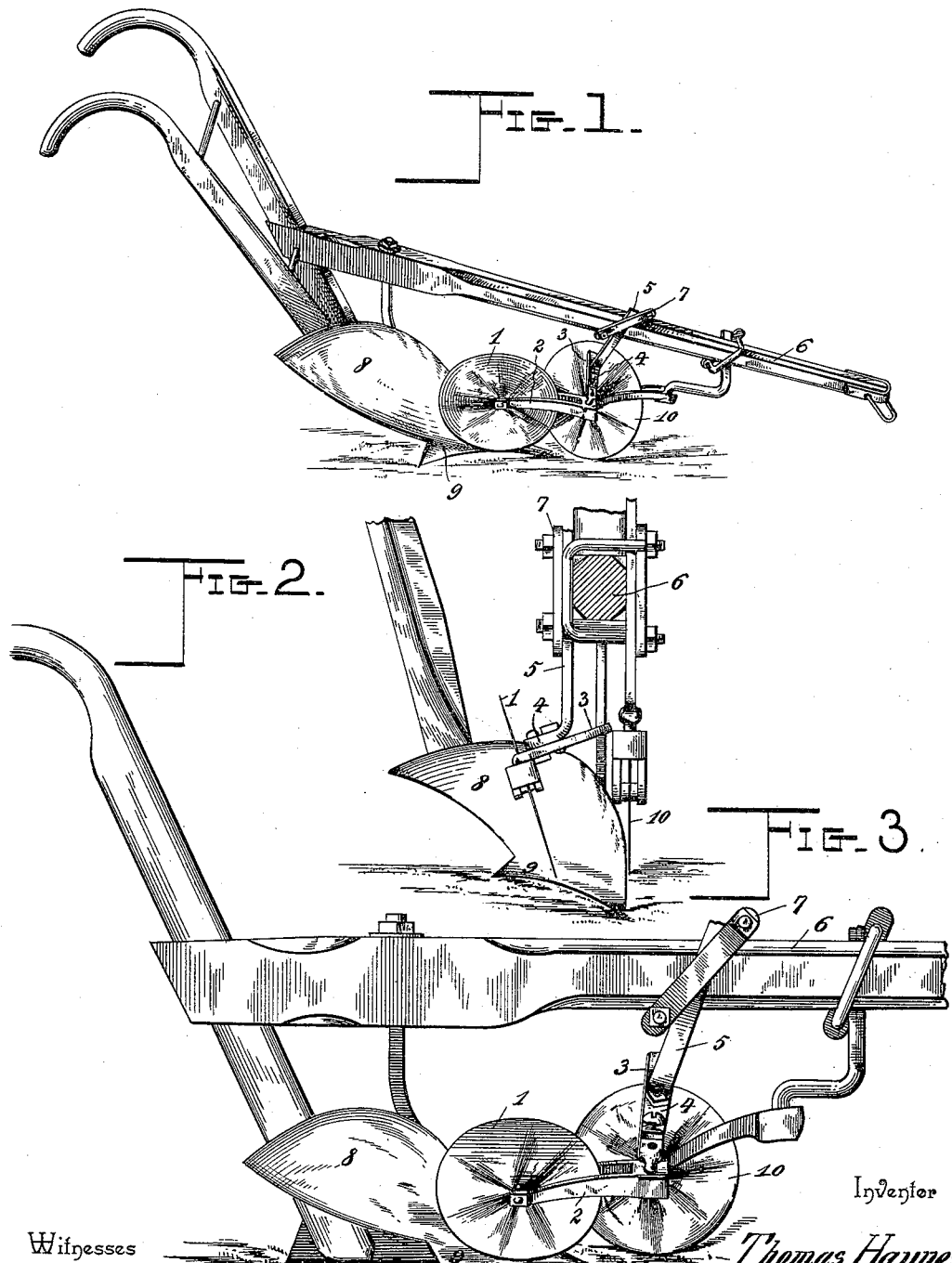

THOMAS HAYNES, OF EDNA, TEXAS.

COLTER ATTACHMENT FOR PLOWS.

SPECIFICATION forming part of Letters Patent No. 607,743, dated July 19, 1898.

Application filed August 5, 1897. Serial No. 647,187. (No model.)

*To all whom it may concern:*

Be it known that I, THOMAS HAYNES, a citizen of the United States, residing at Edna, in the county of Jackson and State of Texas, have invented a new and useful Colter Attachment for Plows, of which the following is a specification.

When preparing land for sowing seed, it is broken by plowing and then harrowed to break clods and lumps and reduce the soil to as fine a condition as possible in order to secure the best results in harvest. When turning the soil by the breaking-plow, whether it be of the riding or ordinary walking type, clods and lumps are formed which when crossing the field with the breaking-plow or harrowing add materially to the labor of the team and farmer.

This invention aims to combine with the plow a rotary colter which subdivides the slice at or near the cutting edge of the share, said colter being disposed so as not to interfere with the action of the moldboard in turning the subdivided slice. By this means the formation of large clods or lumps is obviated. The colter is mounted so as to adapt itself to the line of motion and strain, whereby the draft is not perceptibly increased, and by having the colter of the rotary type it offers a minimum amount of resistance to the soil.

Advantages accruing from the peculiar disposition of the attachment and the special manner of mounting it are contemplated within the scope of the invention and will suggest themselves to such persons as are conversant with agricultural pursuits and implements as the details of the improvement are comprehended, and to this end reference is to be had to the following description and the corresponding parts of the drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of an ordinary breaking-plow, showing the application of the invention. Fig. 2 is a front view of the plow. Fig. 3 is a side elevation.

Corresponding and like parts are referred to in the following description and indicated in the several views of the drawings by the same reference characters.

The invention is designed to be applied to any style of breaking-plow of the sulky or walking variety and is illustrated in connection with a breaking-plow of ordinary construction.

The attachment is in the form of a rotary colter or disk cutter 1 and is mounted in a frame 2, journaled on a pendent arm of a plate 3, having adjustable connection with the bent end 4 of a standard 5, the latter being adjustably connected with the plow-beam 6 by means of a clip 7 of any desired form. The bent end 4 inclines to the horizontal, and the plate 3, adjustably connected therewith, correspondingly inclines, so as to give the proper set to the rotary or disk colter. Any means may be employed for adjustably connecting the plate 3 with the bent end 4 of the standard 5, and, as shown, the plate 3 is formed with a series of openings which receive fastenings passing through corresponding openings in the bent end 4 and plate 3.

By having the frame 2 mounted to turn loosely upon the pendent arm of the plate 3 it will adapt itself to the line of travel of the plow and to the direction of strain, thereby admitting of the colter 1 moving, so as to offer as little resistance as possible to the advance of the plow over the field.

The colter 1 is disposed so that its lower active edge comes directly above or slightly in the rear of the cutting edge of the plow-share, so that the slice is subdivided at or near its line of separation from the ground, thereby permitting the moldboard 8 to turn the slice in the ordinary manner without any interference on the part of the colter. If the colter 1 were set with its lower active edge in advance of the cutting edge of the plowshare 9, the slice would not be cut and subdivided to advantage, so as to become loosened and disintegrated, as is the case where it is subdivided after being cut loose from the ground. If the colter were set too far in the rear of the cutting edge of the plowshare, it would interfere materially with the action of the moldboard and prevent the free passage of the slice and the turning thereof by the moldboard. In order to secure the advantages of the invention, it is of the utmost importance that the colter be located so that its active edge is in line with the cutting edge of the plowshare or slightly in the rear thereof. The colter inclines slightly from the vertical, so as to occupy a position about at right angles to a transverse element of the plowshare, so that the slice of earth may pass by the colter and over the moldboard without being impeded to any perceptible extent by the presence of the colter.

It is the intention to locate the colter so that it will subdivide the slice equally, but, if preferred, it may be arranged to one side or the other of the medial line. The depth of the cut may be varied by adjusting the colter vertically, which is effected by moving the standard 5 vertically and securing it in the located position by means of the clip 7. The adjustable connection of the plate 3 with the bent end of the standard 5 admits of the colter being moved laterally, whereby the required position with reference to the size of the plow may be secured.

The landside-colter 10 is of ordinary construction and arrangement and is supposed to operate in advance of the plow to cut the sod, turf, and ground, whereby the furrow is readily formed and the slice turned. This feature forms no part of the present invention and is shown to distinguish more clearly the present invention from the prior art and to avoid confusion of the part 1 with the ordinary rotary colter, as 10.

Having thus described the invention, what is claimed as new is—

1. The combination with a plow, of a rotary colter or disk cutter located about midway between the inner and outer edges of the plowshare and having its lower cutting edge directly above and about in line with the cutting edge of the said plowshare, whereby the slice of earth formed in turning the furrow is subdivided longitudinally, substantially in the manner set forth for the purpose specified.

2. The combination with a plow, of a rotary colter placed above the plowshare about midway of its inner and outer edges and inclining from the vertical and having its lower cutting edge about in line with the cutting edge of the plowshare, substantially as and for the purpose specified.

3. The combination with a plow, of a rotary colter located above the plowshare about midway of its inner and outer edges with its lower active edge about in line with the cutting edge of the said plowshare, and mounted in a movable frame or support to adapt itself to the line of travel and direction of strain, substantially as set forth.

4. The combination with a plow, of a rotary colter located above the plowshare about midway of its inner and outer edges and having the lower portion of its cutting edge about in line with the cutting edge of the plowshare, and adjustable mountings for the said rotary colter to admit of it being moved vertically and laterally, substantially as described for the purpose set forth.

5. The combination with a plow, of a standard having its lower end bent at an inclination to the horizontal, a plate adjustably connected with the bent end of the standard, and formed with a pendent arm, a frame mounted to turn upon the said arm, and a rotary colter journaled to the said frame and located above the plowshare about midway of its inner and outer edges with the lower portion of its cutting edge about in line with the cutting edge of the plowshare, substantially as described for the purpose set forth.

6. The combination with a plow, of a standard having its lower end bent at an inclination to the horizontal, means for adjustably connecting the standard with the plow-beam, a plate having a pendent arm, means for adjustably connecting the plate with the bent end of the standard, a frame mounted to turn loosely upon the said pendent arm, and a rotary colter journaled to the said frame and normally inclining from the vertical and arranged above the plowshare about midway of its inner and outer edges with its lower active edge about in line with the cutting edge of the said plowshare, substantially in the manner and for the purpose specified.

In testimony that I claim the foregoing as my own I have hereto affixed my signature in the presence of two witnesses.

THOMAS HAYNES.

Witnesses:
  A. SCHMIDT,
  R. C. SAUNDERS.